Patented Sept. 28, 1937

2,094,045

UNITED STATES PATENT OFFICE 2,094,045

METHOD OF MAKING GERMINAL GLAND HORMONE DERIVATIVES AND PRODUCT THEREOF

Walter Schoeller, Berlin-Westend, Friedrich Hildebrandt, Hohen Neuendorf, near Berlin, Germany, and Erwin Schwenk, Bloomfield, N. J., assignors to Schering-Kahlbaum A. G., Berlin, Germany No Drawing. Original application October 24, 1933, Serial No. 694,998. Divided and this application July 23, 1936, Serial No. 92,140. In Germany October 27, 1932

3 Claims. (Cl. 260—131)

This invention relates to hormones and more particularly to derivatives of germinal gland hormones of the formula $C_{18}H_{28}O_2$ and to methods of making the same. The structural formula thereof is as follows:

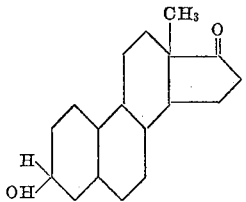

wherein the substituent groups on each of the end rings are most likely in the positions shown.

The present application is a division of our copending application Serial No. 694,998, filed October 24, 1933, and entitled "Germinal gland hormone derivatives of the formula $C_{18}H_{28}O_2$ and method of making same".

It is among the objects of this invention to treat the follicle hormones in such a manner as to change the characteristics thereof and to provide properties in derivatives so formed analogous to the properties of the male hormones.

It is further an object of this invention to provide a method whereby derivatives of germinal gland hormones of the formula $C_{18}H_{28}O_2$ are obtained by using reduction products of follicle hormones as starting materials, said products having the following structural formula:

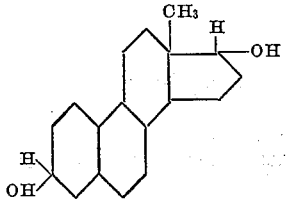

wherein the substituent groups on each of the end rings are most likely in the positions shown, and subjecting the latter to first, an oxidizing treatment and then a reducing treatment, whereby the desired product is obtained.

The reduction products of follicle hormones mentioned above include, for instance, those products which are obtained by hydrogenating the follicle hormones, such as the hormone of the formula $C_{18}H_{22}O_2$, and having most probably the following structural formula:

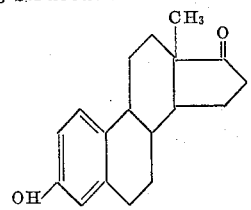

The production of such compounds is described in our copending application Serial No. 694,688, filed October 21, 1933, entitled "Method for the production of hydrogenation products of the follicle hormones".

In practicing our invention, we may take the octahydrofollicle hormone and subject the same to a sufficiently strong oxidation treatment whereby both of the secondary alcohol groups therein are oxidized to ketone groups and thereafter subjecting the di-ketone so formed to a reduction of such character that only one of the ketone groups is transformed into a secondary alcohol group, thus forming a ketoalcohol.

The derivatives of germinal gland hormones of the formula $C_{18}H_{28}O_2$, obtained by the above described method, represent new hydroxyketones or ketoalcohols which exhibit a very remarkable and beneficial effect upon the growth of the capon comb. Thus, this invention enables one to transform the female germinal gland hormones into substances which are very similar to the male germinal gland hormones and which have the desired effects of the male hormones.

The following is an example illustrating the character of the present invention and giving a practical means of obtaining the desired result:

*Example*

1 gram of the reduction product of the follicle hormone $C_{18}H_{30}O_2$,

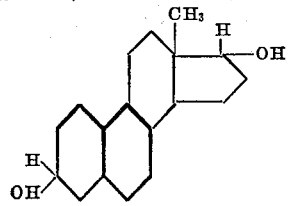

is oxidized at 60° C. by means of an excess of chromic acid and sulfuric acid. Thereby a diketone of the formula $C_{18}H_{26}O_2$ is obtained, which has most probably the following structural formula:

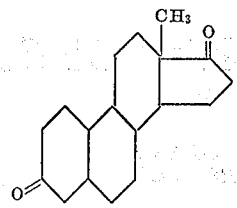

wherein the substituent groups on each of the end rings is most probably in the positions shown. This product, without further purification, is dissolved in alcohol or glacial acetic acid, a platinum oxide catalyst is added to the solution and hydrogen is passed through the latter until two atoms of hydrogen are absorbed. After filtering off the catalyst, water is added to the filtrate. Thereby a crystalline mass is precipitated which is purified by recrystallization from diluted alcohol. The ketoalcohol of the formula $C_{18}H_{28}O_2$ is obtained in white crystals.

Other oxidation agents may be used which are capable of oxidizing the octahydrofollicle hormone $C_{18}H_{30}O_2$ which contains two secondary alcohol groups to the corresponding diketone $C_{18}H_{26}O_2$.

The reduction of the latter may be carried out not only by means of catalytically activated hydrogen, but also by means of hydrogen activated in another manner, for instance, by atomic hydrogen or hydrogen in statu nascendi, or the like.

While we have described our invention giving a single specific embodiment thereof, it is, of course, understood that said example does not limit the invention but merely illustrates the same. It will be obvious to those skilled in the art that various changes may be made in the details of operation, such as the temperatures, quantities of materials used, types and characters of solvents, catalysts, and other details. A different source of hydrogen for the reduction may be used as well as a different means for the oxidation. The reactions involved need not be carried to completion, whereby a mixture of products will result, but preferably the reactions are carried on as completely as practical.

These and other changes may be made in the details disclosed herein without departing from the spirit of the invention, the scope of which is defined in the claims appended hereto.

What we claim is:—

1. A method of producing ketoalcohols of the formula $C_{18}H_{28}O_2$ which comprises first subjecting reduction products of the follicle hormones, having the following structural formula:

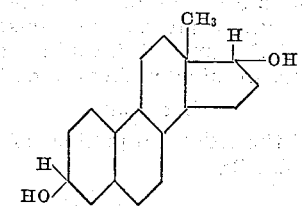

wherein the substituent groups on each of the end rings are most likely in the positions shown, to the action of oxidizing agents capable of transforming alcohols into ketones so as to transform said reduction products into diketones having the following structural formula:

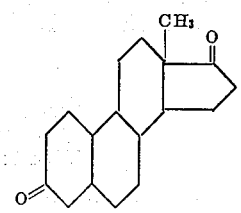

and then partially hydrogenating said diketones to form ketoalcohols.

2. A method of producing ketoalcohols of the formula $C_{18}H_{28}O_2$ which comprises first subjecting reduction products of the follicle hormones, having the following structural formula:

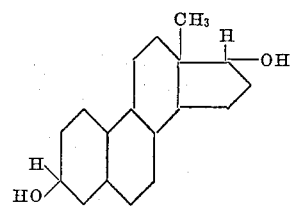

wherein the substituent groups on each of the end rings are most likely in the positions shown, to the action of oxidizing agents capable of transforming alcohols into ketones so as to transform said reduction products into diketones having the following structural formula:

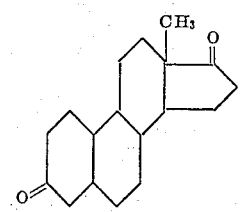

and then partially hydrogenating said diketones to form ketoalcohols by subjecting the same to activated hydrogen.

3. A product having the following structural formula:

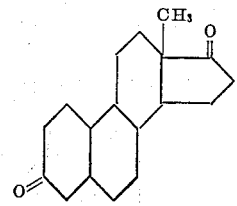

wherein the substituent groups on each of the end rings are most likely in the positions shown.

WALTER SCHOELLER.
FRIEDRICH HILDEBRANDT.
ERWIN SCHWENK.